United States Patent
Yu et al.

(10) Patent No.: US 11,113,864 B2
(45) Date of Patent: *Sep. 7, 2021

(54) GENERATIVE IMAGE SYNTHESIS FOR TRAINING DEEP LEARNING MACHINES

(71) Applicant: The Boeing Company, Chicago, IL (US)

(72) Inventors: Huafeng Yu, Santa Clara, CA (US); Tyler C. Staudinger, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/866,320

(22) Filed: May 4, 2020

(65) Prior Publication Data
US 2020/0265630 A1      Aug. 20, 2020

Related U.S. Application Data

(63) Continuation of application No. 15/634,023, filed on Jun. 27, 2017, now Pat. No. 10,643,368.

(51) Int. Cl.
*G06T 15/00* (2011.01)

(52) U.S. Cl.
CPC ........ *G06T 15/005* (2013.01); *G06T 2215/16* (2013.01)

(58) Field of Classification Search
None
See application file for complete search history.

(56) References Cited

U.S. PATENT DOCUMENTS

| | | | |
|---|---|---|---|
| 5,901,246 | A | 5/1999 | Hoffberg et al. |
| 8,274,506 | B1 | 9/2012 | Rees |
| 9,760,690 | B1 | 9/2017 | Petkov et al. |
| 10,643,368 | B2 | 5/2020 | Yu et al. |
| 2004/0104935 | A1 | 6/2004 | Williamson et al. |
| 2008/0246759 | A1 | 10/2008 | Summers |

(Continued)

OTHER PUBLICATIONS

Google earth. (May 18, 2017). Retrieved Feb. 16, 2021, from https://en.wikipedia.org/w/index.php?title=Google_Earth oldid=781045055 (Year: 2017).*

(Continued)

*Primary Examiner* — Vu Nguyen
(74) *Attorney, Agent, or Firm* — Alleman Hall Creasman & Tuttle LLP

(57) ABSTRACT

A set of 3D user-designed images is used to create a high volume of realistic scenes or images which can be used for training and testing deep learning machines. The system creates a high volume of scenes having a wide variety of environmental, weather-related factors as well as scenes that take into account camera noise, distortion, angle of view, and the like. A generative modeling process is used to vary objects contained in an image so that more images, each one distinct, can be used to train the deep learning model without the inefficiencies of creating videos of actual, real life scenes. Object label data can be generated for each distinct image. This and other methods can be used to artificially create new scenes that do not have to be recorded in real-life conditions and that do not require costly and time-consuming, manual labelling or tagging of objects.

20 Claims, 7 Drawing Sheets

(56) References Cited

U.S. PATENT DOCUMENTS

| | | | |
|---|---|---|---|
| 2009/0021513 A1* | 1/2009 | Joshi | G06T 15/005 345/419 |
| 2013/0155058 A1 | 6/2013 | Golparvar-Fard et al. | |
| 2014/0192046 A1 | 7/2014 | Paragios et al. | |
| 2015/0228114 A1 | 8/2015 | Shapira et al. | |
| 2015/0325043 A1 | 11/2015 | Bromley et al. | |
| 2016/0042552 A1 | 2/2016 | Mcnabb | |
| 2016/0171744 A1 | 6/2016 | Rhoads et al. | |
| 2017/0221226 A1* | 8/2017 | Shen | G06T 7/80 |
| 2018/0082172 A1 | 3/2018 | Patel et al. | |
| 2019/0228571 A1* | 7/2019 | Atsmon | G06T 19/006 |

OTHER PUBLICATIONS

U.S. Appl. No. 15/634,023, Advisory Action dated Apr. 11, 2019, 3 pgs.
U.S. Appl. No. 15/634,023, Final Office Action dated Feb. 5, 2019, 19 pgs.
U.S. Appl. No. 15/634,023, Non Final Office Action dated Jul. 1, 2019, 19 pgs.
U.S. Appl. No. 15/634,023, Non Final Office Action dated Oct. 9, 2018, 17 pgs.
U.S. Appl. No. 15/634,023, Notice of Allowance dated Dec. 31, 2019, 8 pgs.
Bromley US2015/0325,043.

\* cited by examiner

GENERATIVE IMAGE SYNTHESIS FOR TRAINING DEEP LEARNING MACHINES

CROSS-REFERENCE TO RELATED APPLICATIONS

This application is a continuation of U.S. patent application Ser. No. 15/634,023 entitled: "GENERATIVE IMAGE SYNTHESIS FOR TRAINING DEEP LEARNING MACHINES" filed on Jun. 27, 2017, and issued as U.S. Pat. No. 10,643,368 on May 5, 2020, which is incorporated herein by reference in its entirety for all purposes.

BACKGROUND

1. Field

Disclosed herein is information that relates to software for training and testing algorithms for deep machine learning. More specifically, it relates to synthetically creating multiple images with labelling data to be used for training and testing algorithms.

2. Description of the Related Art

Deep learning, also referred to as machine learning, has been adopted in numerous domains. However, deep learning generally requires large quantities of data for training and evaluating (testing) the algorithm underlying the machine. It is important to use quality data for this training and evaluating, as this has a direct impact on the performance of the algorithm that underlies the machine. A critical factor with respect to quality is ensuring that the data is accurately labeled before use. Labeling and collecting the large volume of data requires vast amounts of manual work, much of it done by human beings.

The process of training a deep learning network, particularly neural networks, is time and resource consuming. Individuals, many of them engineers, need to tag or label (describe) images for the initial training rounds for the underlying algorithms. As noted, the volume of data is extremely large and is likely to continue growing. Image data sets can contain tens of thousands of images which all need to be tagged. Larger image data sets usually result in better learning results for the algorithms. However, tagging the training data is a significant barrier to creating larger and higher quality data sets.

One of the techniques presently used to collect and label data for machine learning is, as noted, manually collecting and labeling the data by human beings. This may be infeasible if access to a location is not possible or restricted, such as on a military site.

Another technique that has been used is commonly referred to as crowdsourcing, appealing to third parties and individuals to help collect and label data. However, this method has proven to also be expensive and prone to error. Another technique that has been used is generating simulated data instead of gathering actual or real data. The simulated data is typically generated from a game environment. However, the resulting simulated data or model may not be accurate or be of poor quality. Consequently, these data exhibit poor performance when used to train algorithms for deep learning (that is, when the simulated data are actually "fielded.")

These endeavors have either required significant investment of time, human labor, and money to produce, or have proven unreliable. What is needed is a new approach to data collection and labeling suitable for training and testing deep learning machine algorithms. One that does not require actual data collection, but data generation which utilizes and combines existing data sources and where labeling of the data is greatly facilitated by virtue of data generation and existing data sources.

SUMMARY

One aspect disclosed is a method of generating images for training a machine learning algorithm is described. A user or designer populates a 3D occupancy grid map with one or more objects that are relevant to the image or scene the designer is intending to create. From the occupancy grid map, the perspective is changed to create a ground view of the map, referred to as a first 3D scene. From the first 3D scene, a 2D scene is generated. With respect to the objects placed in the scene or image by the designer, a first set of object label data is generated for the one or more objects. In one embodiment, generative modeling is performed on the 2D scene from which one or more realistic scenes are created, each realistic scene varying in some manner with respect to the objects. Multiple specialized scenes are created from the realistic scenes, where the specialized scenes take into account environmental and weather conditions and camera distortions and noise. A second set of object label data is created based on object placement in the final specialized scenes.

In another aspect, a system for creating images that can be used to train and test a deep learning machine is described. The system includes a scene view module configured to create 3D occupancy grid maps, 3D scenes, 2D scenes, and specialized scenes. A generative modeling module creates multiple realistic scenes which replaces or superimposes object and object-related images with respect to 2D scenes. A label data generator generates and modifies object label data for objects placed in the realistic scenes and in the specialized scenes. The system also includes an object image retrieval module configured to retrieve images of objects and object-related images for the generative modeling module. The scene view module is also configured to apply climate-related conditions and camera distortions to the realistic scenes to create specialized scenes.

DETAILED DESCRIPTION

Figure 1:
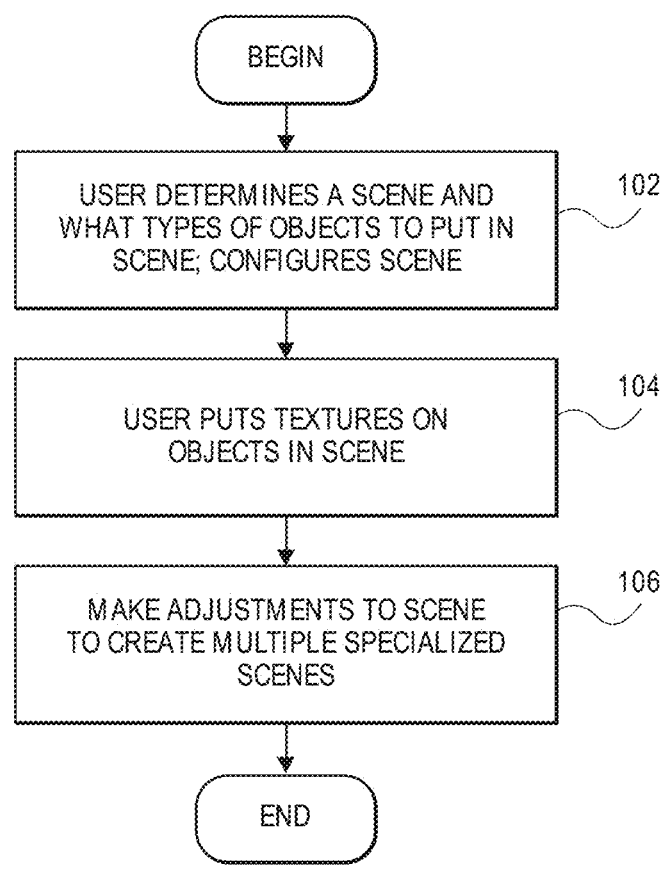
FIG. 1 is a flow diagram of an overview of a process for creating training data in accordance with one embodiment.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting. On the contrary, it is intended to cover alternatives, modifications, and equivalents as may be included within the spirit and scope of the described embodiments as defined by the appended claims.

For example, methods and systems will be described in the context of deep learning machines for self-driving vehicles. In the following description, numerous specific details are set forth in order to provide a thorough understanding of the various embodiments. Particular example embodiments may be implemented without some or all of these specific details. In other instances, well known process operations have not been described in detail in order not to unnecessarily obscure the described embodiments. Various techniques and mechanisms will sometimes be described in singular form for clarity.

However, it should be noted that some embodiments include multiple iterations of a technique or multiple instantiations of a mechanism or technique unless noted otherwise. For example, a system uses a processor in a variety of contexts. However, it will be appreciated that a system can use multiple processors while remaining within the scope of the described embodiments unless otherwise noted. Furthermore, the techniques and mechanisms will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

One embodiment is a method for training deep learning machines (also referred to as deep neural networks). It starts with 3D occupancy grid maps and a database of tagged images to transform existing images. These transformed images may be used for training deep neural networks. It does so without costly manual tagging of objects in the images and without capturing images in the field.

Methods and systems for creating highly realistic scenes for training and testing deep learning models are described in the various figures. In one embodiment, the system creates a high volume of scenes having a wide variety of environmental, weather-related factors as well as scenes that take into account camera noise, dark corners, distortion, angle of view, etc. The system of the described embodiment is able to multiply the efficacy of a small set of images or scenes by using the small number of scenes to generate a very large volume of widely varying scenes which can be used to train a deep learning machine as described below. For example, an autonomous vehicle must be able to recognize a street even if there is snow covering most of it. In order to train the algorithm underlying the model to recognize that there is a street covered with snow, presently a human being must drive on a street covered with snow while taking a video. The video images are used to train the model to recognize this environmental scenario so that the autonomous vehicle can deal with a snow-covered street (or rain storm, fog, etc.) when in actual use. In one embodiment, the system can artificially impose snow or other weather conditions onto an existing scene. This and other methods described below can be used to artificially create new scenes that do not have to be recorded in real-life conditions and that do not require costly and time-consuming, manual labelling or tagging of objects, such as humans, animals, street signs, plants, trees, and a wide variety of other physical objects in those scenes.

FIG. 1 is a flow diagram showing an overview of the process of creating a large volume of images in accordance with one embodiment. As noted, the objective is to obtain a high volume of object-labeled scenes that can be used to train and/or test a deep learning model. In this context, an object-labeled scene is characterized as a scene where physical things in the scene have labels indicating, among other things, the location of the physical object, what the object is, and other information. At step 102 a designer wants to build a specific type of scene, for example, a tarmac. She obtains a grid map showing one instance of a conventional tarmac which shows no physical objects, in other words, that is a plain, unoccupied tarmac. She decides what types of objects she wants to put on the tarmac, such as luggage-carrying vehicles, jet fuel vehicles, passenger transport structures, physical airport structures, a control tower, etc. The objects or physical things she selects at this step are rigid, conforming, non-varying type objects. After selecting the objects, she then configures the volumetric space for each object in the scene. She decides where to place these physical things by putting placeholders for them in the scene.

At step 104 she places real textures on the volumetric object placeholders and, more generally, texturizes the scene. This makes the objects look like they would in real life and the tarmac scene look realistic so a control tower looks like one would in real life. In another example, if the scene is a street, the designer could put trees, street signs, buildings, etc. in the scene. As noted, in one embodiment, the objects configured and texturized in steps 102 and 104 are rigid, conforming objects, physical things that do not change or have much or any variation. This results in what is referred to as a realistic scene. Since all the objects in the scene and their locations are selected and configured by the designer, the system automatically has all labeling data for objects in the scene.

At step 106 the realistic scene is adjusted or transformed to account for a wide range of potential distortions that can result from the environment/weather and from camera distortions. This step can be characterized as applying a library of filters to the realistic scene. By doing this and creating then transformed realistic scenes, the algorithm may be trained to deal with conditions that might be experienced in actual use when a camera on an airplane, car or other vehicle experiences lens distortion, drift, dark corners, etc. that distort a captured image at least minimally or, as described above, when weather changes what the camera captures. The final set of images that are outputted from step 106 can be used to train a deep learning machine with a significant variety of scenes to better handle such off-nominal conditions or to test deep learning algorithm robustness.

Figure 2:
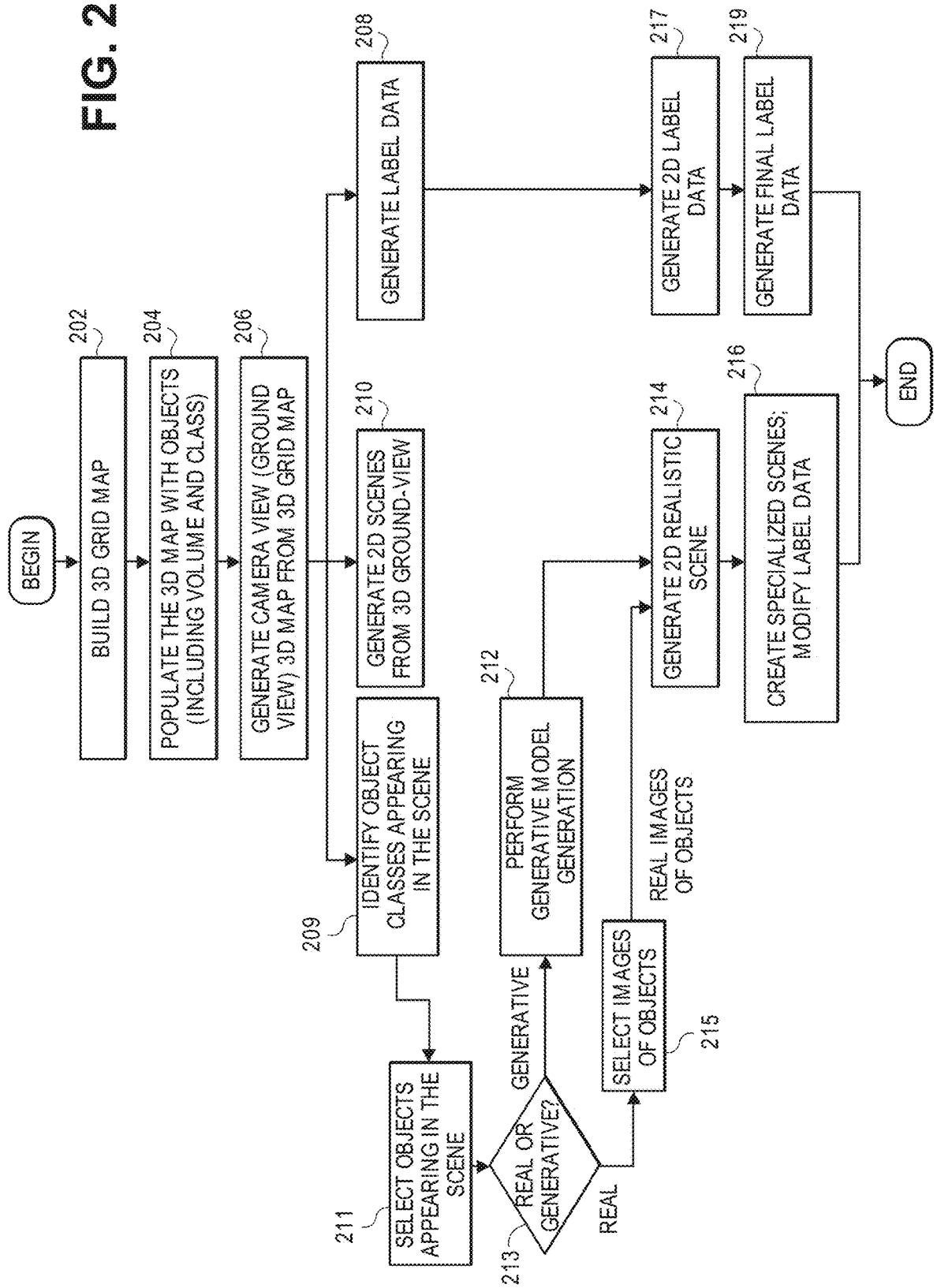
FIG. 2 is a flow diagram of a process of creating training data using a generative model in accordance with one embodiment.
Figure 5A:
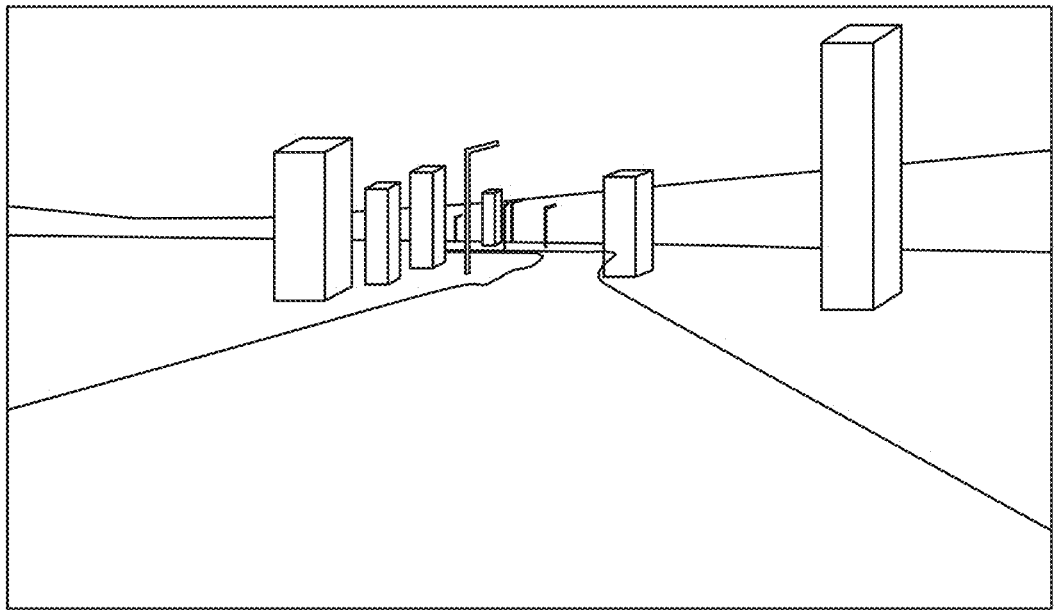
FIGS. 5A to 5C are examples of images described in the various embodiments.
Figure 5B:
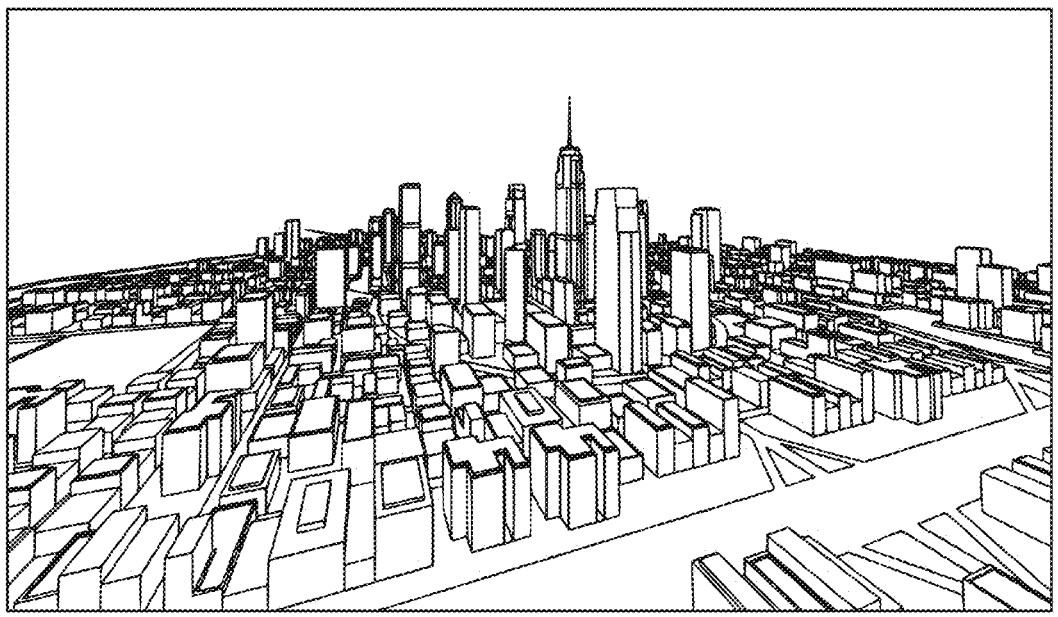

FIG. 2 is a flow diagram showing a process of creating a set of specialized scenes that can be used to train and test a deep learning algorithm using generative modeling in accordance with one embodiment. At step 202 the designer builds or retrieves a 3D occupancy grid map. An example of an occupancy grid map is shown in FIG. 5B. These maps can show a wide variety of scenes, but many of them are of streets, roads, highways, runways, tarmacs, and the like with typical objects and tangible objects including natural objects, man-made objects, and the like. That is, scenes of places were there would likely be moving or self-driving vehicles. A 3D grid map may be of a city or a town showing streets and roads or of an airport showing runways.

At step 204 the 3D grid occupancy map is populated with objects or, more specifically, with volumetric spaces that will be "occupied" by objects and physical things. The 3D occupancy grid map can be seen as a template and can be described as a static scene for training. For example, a rectangular box of a certain color can be a volumetric space for a tree. Another box having a different color can be for a street sign and so on. Not all the objects are discrete objects, for example, there can be an area in the grid map of a certain color that indicates grass, hills, sidewalk, a horizon, and so on. Each volumetric space is occupied by one or more objects or physical things and is configured by the designer.

At step 206 the perspective of the camera is changed based on the 3D map in step 204. The scenes created are ultimately used to build an extensive set of training data. A "camera" or ground view perspective is generated. By setting up a 3D camera, a perspective-specific 3D map is created or generated from the 3D map at step 204. An example of a perspective-specific 3D map is shown in FIG. 5A.

By changing the angle or perspective of the camera, as well as changing the camera position, some objects may be fully or partially hidden or blocked by other objects. As such, at step 204, object visibility is determined. Furthermore, there can be many perspective-specific 3D maps created by shifting the camera to many different angles and different locations, i.e., many different perspectives can be obtained. The designer can now see objects on and around a street, for example, from the perspective of a driver in a vehicle. By creating these 3D maps from the one or more perspective transformations, the training algorithm will ultimately have more varieties and richness of scenes to train with.

At step 208 the system generates tagging or label data for the objects in the 3D grid map created in step 206. The system knows what objects, including physical things and environmental elements are in the scene and where they are so it already has all the tagging data, also referred to as labels since objects are put in the scene by the designer. That is, in parallel, as the designer puts the objects in the 3D occupancy grid map. The system knows that when the designer puts a tree from an object library at a certain location in the 3D grid map, it has label data on the tree (i.e., basically, this object is from object class "tree" and is a Pine tree) and it has the location of the Pine tree as soon as the designer puts it there. More specifically, it has the exact pixels in the 3D grid map that are used to show the tree. In one embodiment, each pixel in the grid map is designated as belonging to a specific object, for example, a tree or a street. As such, at step 208 all the label data for all the objects placed in the 3D grid map is generated and associated or coupled with the grid map. It can be described as two separate files.

Automatic labeling of objects initially starts with the 3D grid maps, created at the beginning of the process. The 3D maps are populated or occupied with objects whose labels are known and associated or linked to the 3D maps simultaneously; the 3D maps are created with object labels. As described below, these labels undergo the same transformation and specialization at the pixel level that are performed to create the 2D images. As such, the final scene has coherent and accurate object label data for each pixel.

Figure 5C:
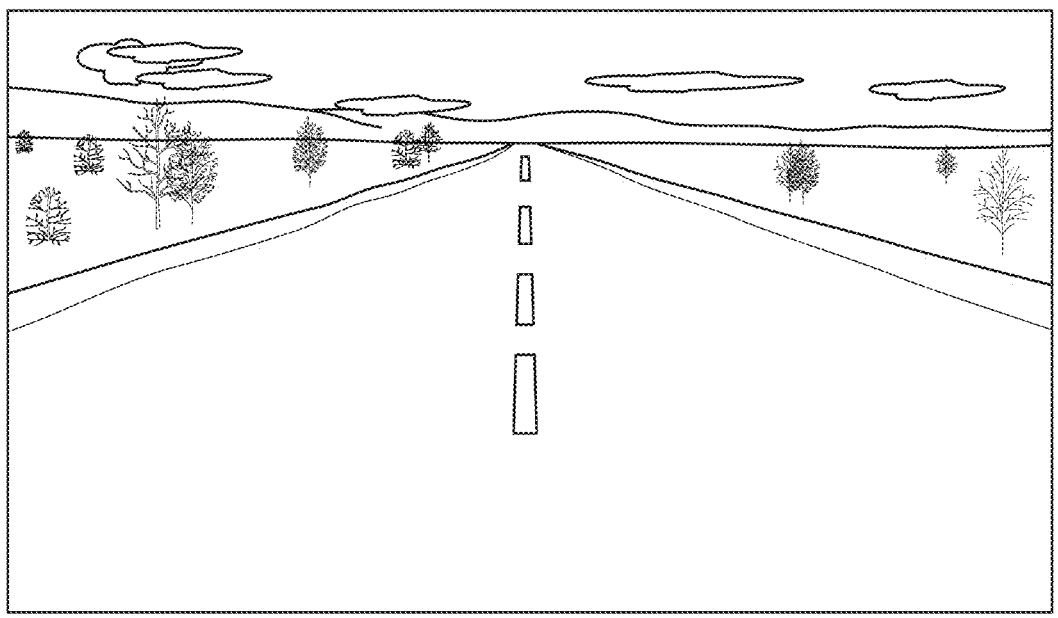

At step 210 2D scenes are generated from the 3D ground-view grid map (created at step 206). In this step objects that were hidden are deleted since they do not play a role in training the algorithm. The system also sets brightness, contrast, luminosity, saturation, and other basic image characteristics of the 2D scene. Step 210 may generate more than one 2D scene. Once a 2D scene is created at step 210, the system generates what is referred to as a 2D realistic scene. An example of a realistic scene is shown in FIG. 5C. Hidden objects are removed and basic image characteristics are set: brightness, contrast, luminosity, saturation, etc.

There are two ways to create these 2D realistic scenes. One is by inserting images of real objects into the 2D scenes. Images of real objects can be retrieved from a database. In this embodiment, the system does not perform generative modeling, as described below. A 2D realistic scene is a scene that is close to what can be used to train the deep learning machine algorithm. Further processing is done to the image as described in step 216.

Going back to step 206, the next step is step 209 where the designer identifies "object classes" to appear in the scene. Examples of an object class include "tree", "street", "car", "truck", "aircraft", etc., and an object is a specific type of tree or street, aircraft, etc. All objects belong to an object class. Step 209 may execute at the same time as steps 210 and 208. After the designer has identified the object classes in the 3D scene control goes to step 211 where the designer selects objects from an object database that are in the scene according to the object classes identified in the step 209. Once the objects are identified images of corresponding objects can be selected from an object or real image database or objects can be generated.

From the 3D scenes created at step 206, the system identifies all objects that appear in the scene (e.g., trees, people, signs, buildings, etc.), so that these objects can be replaced by real images or synthetically generated images. Information on the objects is also obtained, such as volume, object dimensions, headings or a name of the object, and orientation.

For example, the designer can select trees, street signs, background objects, surrounding objects, buildings, people, etc. that are in the scene from a database or library of images of "real objects." The specific type of object, e.g., trees, street signs, buildings that are selected depends on the user's choice: random, user-designated, or mixed. The system then determines whether the image is real or synthetic. If the object is real, control goes to step 215 where the system selects or retrieves an image of the object. The system then goes to a decision at step 213. Here the system (or designer) determines whether images of the objects to be placed in the scene are images of real objects in the database or synthetic images from a generative process performed on the images of real objects from the database or library. If the decision is to choose real images, control goes to step 215 where the system and/or designer selects images of real objects directly from the database. As described above, objects can be a wide variety of physical things and other elements or components of a scene or image.

If the decision is to use synthetic images (i.e., images derived from generative modeling), control goes to step 212 where the system performs a generative model process to create synthetic images with the images from the database. This generative model process is performed using a deep learning approach or a traditional computer vision approach. The process creates multiple variations of an object, as described below in FIG. 3.

The output from step 212 is a set of synthetic images of objects that can vary. These synthetic images of objects are used at step 214. There the system uses the images to generate 2D realistic scenes as described above. The system may also use images of real objects, that is, objects not created from generative modeling. These images are referred to as "real images" of objects and are used to generate a 2D realistic scene at step 214.

Although real images alone can be used for training deep neural networks, these images alone are not usually sufficient. For example, a real image can be a scene of a street during the day where all the objects, the street, horizon, etc. are all clear (no environmental distortions, perfect camera image). However, in production or real life conditions, images may be captured (during actual use) during inclement weather, such as a snow storm or days with poor visibility or lighting, where objects and the street, sidewalk, and other parts of a scene are not clearly identifiable. These conditions must be taken into account in training the algorithm. Another factor is distortion of an image as it is captured by the camera (again, during actual use). A camera can capture an image of the street, but there may be distortions to the image from the camera before the image can be used by the algorithm. These distortions may include drift, dark corners, etc. These distortions will be in the image.

At step 216 a single realistic scene is used to create multiple specialized scenes. Each of these specialized scenes is a modification of the original realistic scene. As such, the pixels in a specialized scene may be different from those in the realistic scene. These pixels are re-labeled or re-designated as needed. For example, when camera distortion is applied, some of the pixels in the images are modified, and, as such, their associated classes may be different from the original labels. To address this problem, the same distortion filters are also applied to the label data, so that label data have the same modification as the images. However, in this specialization process, weather conditions, like rain, snow, and fog, will only change the images (partially obscure or camouflage them), but not their label data. For example, snow-covered roads or trees are still recognized as roads or trees in the label data.

Returning to step 208 where the system generates label data for the ground-view 3D map (created at step 206), as noted, being able to generate this tagging data is a major advantage because it enables bypassing the costly manual and field work normally required to obtain this data and make it useful for training and testing. From the label data for the 3D map, the system generates 2D label data at step 217. This label data corresponds to images created at step 214. The same processing that occurs at step 214, such as perspective transformation, considerations of volume, heading, orientation, etc. is performed at step 217. This is done at the same time the system performs step 214 where a 2D realistic scene is generated. The 2D label data may be described as being stored in a separate file that is closely linked to or associated with the file that contains the 2D realistic scene (created at step 214). A final object label data set is generated at step 219 to correspond to the generation of specialized scenes at step 216. This object label data corresponds to specialized images created at 216. The same specialization processes that are applied at step 216, such as camera drift, distortion are applied to the image.

As described, the object label data may change for each specialized scene because the pixels in the scene may be altered and, as such, correspond to different objects, e.g., distorted image of a sidewalk, tree, or street sign. However, weather conditions, like rain, snow, and fog, will not change the label data.

As described above, one of the goals is to create a large set of specialized images from a small set of images and do so with minimal effort and expense. One way to do this is to combine artifacts or objects programmatically in one scene and use it to create many scenes, each having a specific combination of those artifacts. In the described embodiment, this is referred to as a generative model. By combining randomly assembled objects in a scene, a few hundred initial scenes can be synthesized and expanded to be millions of synthetic scenes that can be used to train and test a deep learning model.

A generative model is used to combine objects that are suitable for variation, that is, those objects which can, and likely do, vary in real life. The most common examples of this include people and vehicles. People can vary widely, ranging from height, weight, clothing, etc. Another example is plants, trees, and vegetation in general. Such objects, such as trees, can vary significantly in height, size, and the like. Another example is vehicles, such as cars, which can also vary widely with respect to general dimensions. All these types of objects can vary. Those that are consistent or rigid and do not vary much or at all, such as street signs, are inserted into the volumetric spaces described above. In both cases, whether the objects are non-varying or generative, the system knows what the objects are and where they are placed in the scene, that is, which pixels in the image represent those objects. As such, the system has labels for all the objects in the scene. It is also important to note that each of the generative scenes created from the generative modeling described herein is a realistic scene that is later examined and are used to create specialized scenes, which are used to train and test deep learning machines.

Figure 3:
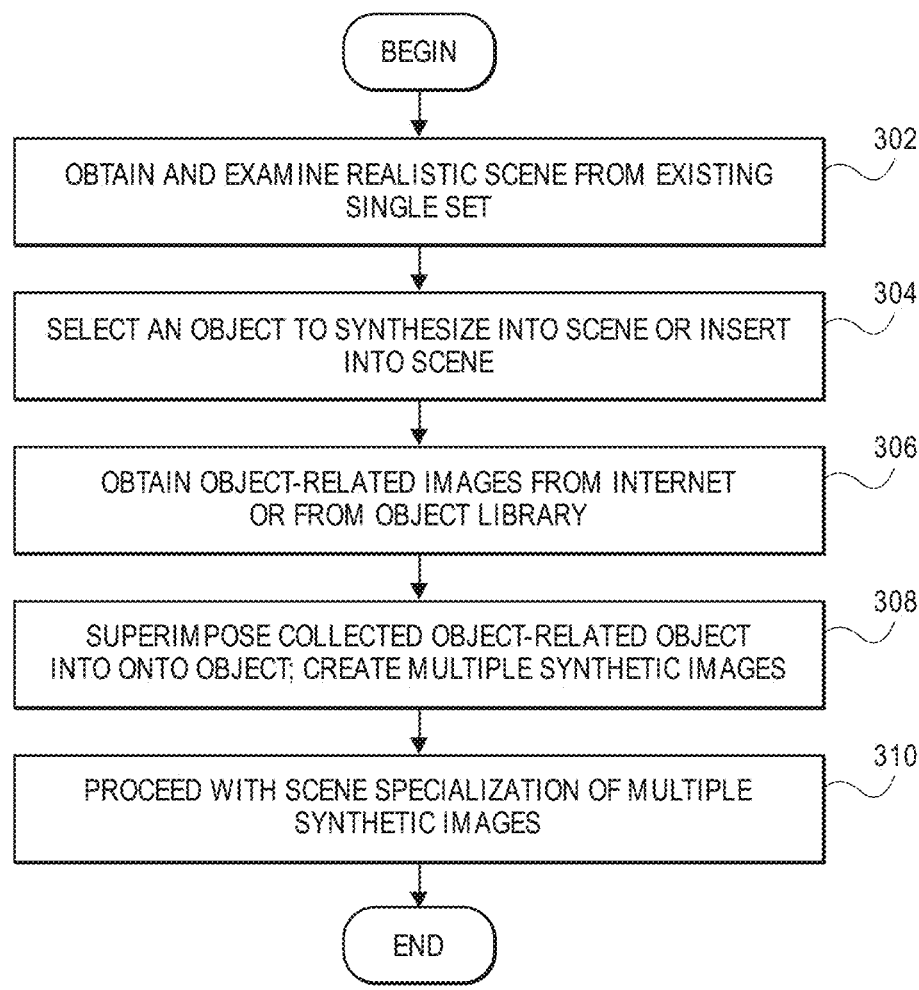
FIG. 3 is a flow diagram of a process of creating synthetic images from a realistic scene or image using a generative model technique in accordance with one embodiment.

FIG. 3 is a flow diagram of a process of creating synthetic images from a realistic scene or image using a generative modeling technique in accordance with the described embodiment. A model learns a set a basis functions from the existing dataset of realistic images. These basis functions create subcomponents of the images from the existing dataset. This is how an existing image, like a human face or a car, can be synthesized to have variations, like a face with sunglasses or a car that is a convertible or SUV. It step 302 the system obtains and examines a realistic scene from the existing dataset created earlier. A realistic scene may have certain characteristics or conditions, such as weather, picture brightness, picture size, objects in the picture, and the like. If some or all of these conditions are satisfied, the realistic scene may be used for synthetic image generation.

At step 304 an object in the realistic scene is selected to be synthesized or subject to generative modeling. In another embodiment, an object can be inserted into the scene and synthesized. This is desirable because the system wants to create as many varied scenes as possible which can be used to make the learning model more robust. The more varying images used to test and train the model, the more intelligent it will be when in actual use. The objects that can be synthesized can vary widely and what types of objects will make sense or are relevant, naturally, depends on the context or environment that the image depicts (e.g., a highway, a city street, a runway, a tarmac, and the like).

At step 306 the system determines how to vary the selected object and fetches object-related images from the Internet or from an internal object library. Initially, it will look in the object library and if an object-appropriate image is not found, it can obtain one online. For example, the object selected in step 304 may be a male adult. The varying object may be sunglasses or a backpack.

At step 308 the object-related images are effectively superimposed onto the object or the object is replaced with the object-appropriate image, such as a man replaced by a woman or a child. In another example, a bike may be replaced with a motorcycle or a truck replaced by an RV. As noted, an original realistic scene can be used to create many synthetic scenes by superimposing/replacing many different object-appropriate images. At step 310 the system proceeds with scene specialization as described above for each of the synthetic images.

Figure 4:
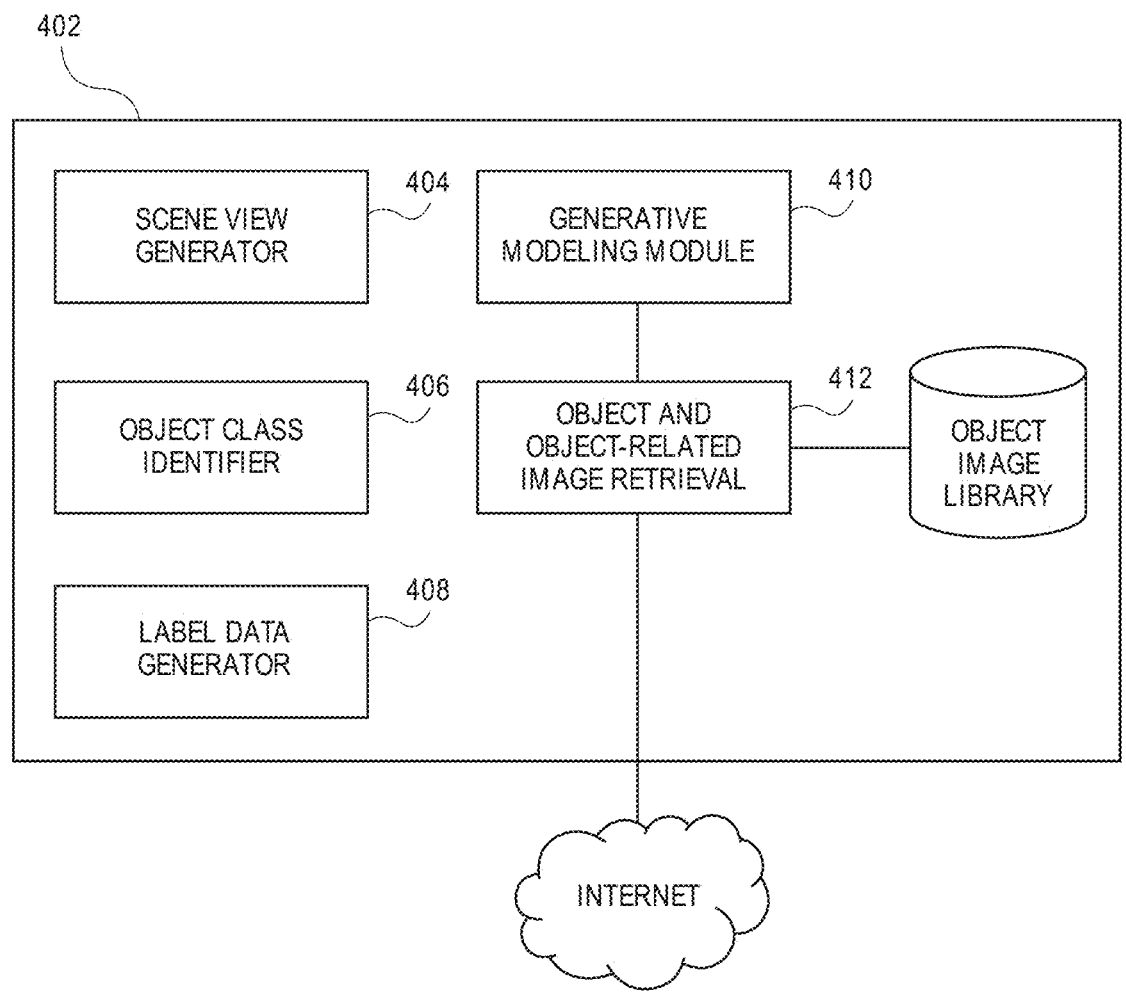
FIG. 4 is a block diagram showing components and modules in the system in accordance with one embodiment.

FIG. 4 is a block diagram of a system in accordance with one embodiment. A generative image and synthesis system 402 includes a scene view generator module 404. This module is utilized for changing the view of an image as described above. For example, it can be used to change view from a 3D occupancy grid map to a 3D map. It can also be used to generate from 2D realistic image from the 3D map. An object class identifier module 406 is for identifying the class of an object as described in step 209. For example, the system identifies object classes such as trees, humans, vehicles, and the like. An object label data generator module 408 creates label data for objects in the scene. In one embodiment, each pixel in the scene is designated to belong to an object or component of the scene. For example, a pixel may be designated as street, tree, horizon, car, etc. The label data generator module 408 is responsible for generating label data after each transformation of a scene. As described in step 208, after the designer selects objects to be in the scene, label data is generated automatically for the 2D scene, followed by 2D label data and final label data for the specialized scenes. The process described in FIG. 3 for generative modeling is executed by module 410 which is in communication with an object and object-related image retrieval module 412.

The described embodiments can be used for enabling safer, faster, and lower cost autonomous systems, such self-driving cars, autonomous aircraft systems with sensing systems, mobile robots, satellites, autonomous submarines, deep learning-based security and safety surveillance, and others.

Described embodiments can reduce the cost and time to collect and label data for machine or deep learning. They can greatly increase the collection of data, thereby improve the accuracy and robustness of deep learning algorithms. By quickly generating realistic data in an automatic manner, it will accelerate the application and validation of machine learning algorithms.

Figure 6:
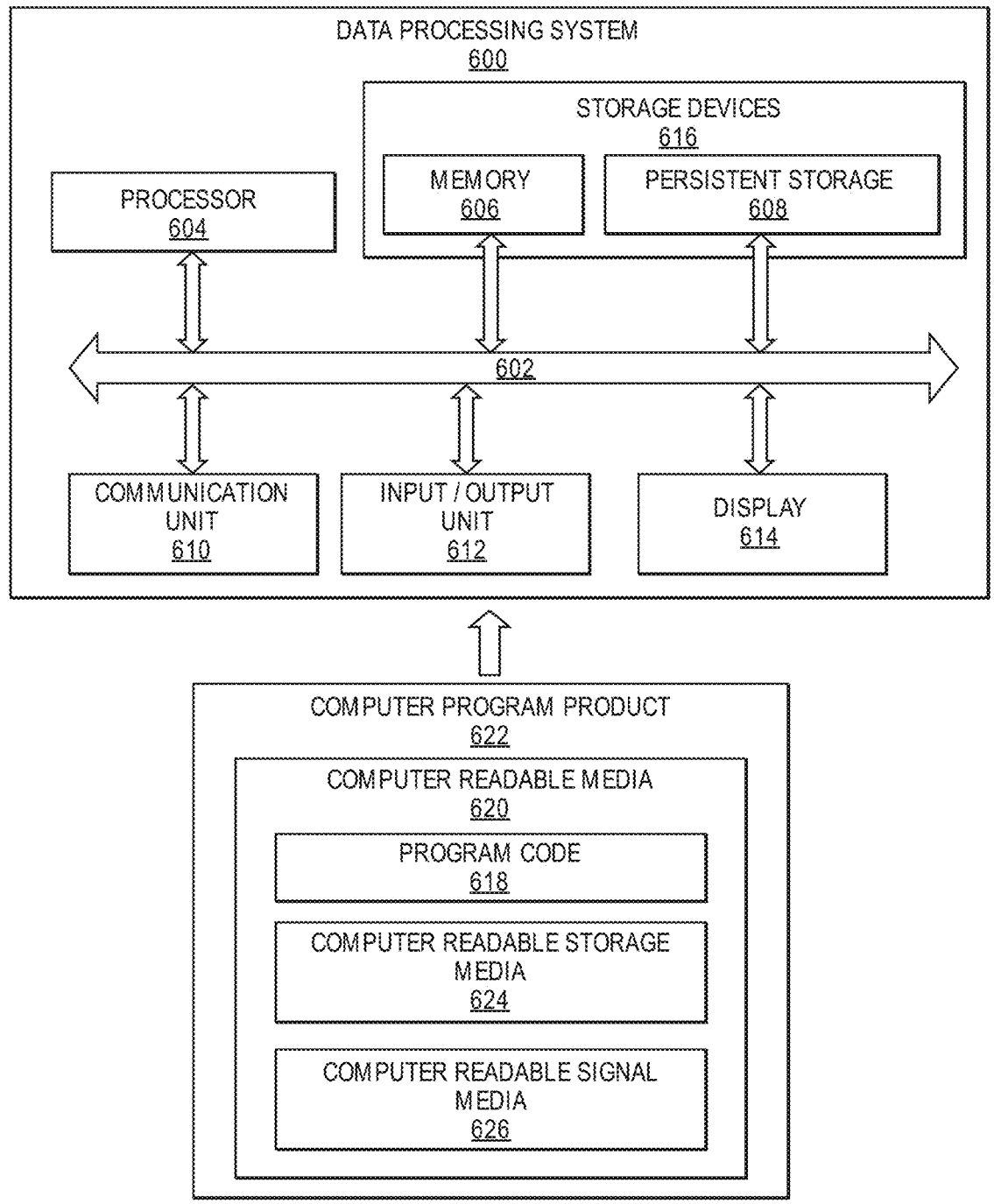
FIG. 6 is a block diagram illustrating an example of a computer system capable of implementing various processes in the described embodiments.

FIG. 6 is an illustration of a data processing system 600 is depicted in accordance with some embodiments. Data processing system 600 may be used to implement one or more computers used in a controller or other components of various systems described above. In some embodiments, data processing system 600 includes communications framework 602, which provides communications between processor unit 604, memory 606, persistent storage 608, communications unit 610, input/output (I/O) unit 612, and display 614. In this example, communications framework 602 may take the form of a bus system.

Processor unit 604 serves to execute instructions for software that may be loaded into memory 606. Processor unit 604 may be a number of processors, a multi-processor core, or some other type of processor, depending on the particular implementation.

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Storage devices 616 may also be referred to as computer readable storage devices in these illustrative examples. Memory 606, in these examples, may be, for example, a random access memory or any other suitable volatile or non-volatile storage device. Persistent storage 608 may take various forms, depending on the particular implementation. For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these illustrative examples, provides for communications with other data processing systems or devices. In these illustrative examples, communications unit 610 is a network interface card.

Input/output unit 612 allows for input and output of data with other devices that may be connected to data processing system 600. For example, input/output unit 612 may provide a connection for user input through a keyboard, a mouse, and/or some other suitable input device. Further, input/output unit 612 may send output to a printer. Display 614 provides a mechanism to display information to a user.

Instructions for the operating system, applications, and/or programs may be located in storage devices 616, which are in communication with processor unit 604 through communications framework 602. The processes of the different embodiments may be performed by processor unit 604 using computer-implemented instructions, which may be located in a memory, such as memory 606.

These instructions are referred to as program code, computer usable program code, or computer readable program code that may be read and executed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transmitted to data processing system 600 for execution by processor unit 604. Program code 618 and computer readable media 620 form computer program product 622 in these illustrative examples. In one example, computer readable media 620 may be computer readable storage media 624 or computer readable signal media 626.

In these illustrative examples, computer readable storage media 624 is a physical or tangible storage device used to store program code 618 rather than a medium that propagates or transmits program code 618.

Alternatively, program code 618 may be transmitted to data processing system 600 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications channels, such as wireless communications channels, optical fiber cable, coaxial cable, a wire, and/or any other suitable type of communications channel.

The different components illustrated for data processing system 600 are not meant to provide architectural limitations to the manner in which different embodiments may be implemented. The different illustrative embodiments may be implemented in a data processing system including components in addition to and/or in place of those illustrated for data processing system 600. Other components shown in FIG. 6 can be varied from the illustrative examples shown. The different embodiments may be implemented using any hardware device or system capable of running program code 618.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method performed by one or more processors of a computer system, the method comprising:
   generating deep learning training data, wherein generating the deep learning training data includes:
   generating a two-dimensional (2D) scene from an electronic representation of a first three-dimensional (3D) scene of a 3D occupancy grid map;
   generating first label data for one or more objects of the 2D scene;
   executing generative modelling on the 2D scene to create one or more realistic 2D scenes;
   creating multiple specialized 2D scenes from each of the one or more realistic 2D scenes, each specialized 2D scene having one or more pixels that differ from each other specialized 2D scene created from each realistic 2D scene; and
   generating final label data for the one or more objects in the multiple specialized 2D scenes.

2. The method in claim 1, further comprising identifying an object class for each object of the one or more objects displayed in the 2D scene.

3. The method in claim 1, wherein creating the multiple specialized 2D scenes includes applying one or more climate-related conditions on the one or more realistic 2D scenes.

4. The method in claim 1, wherein creating the multiple specialized 2D scenes includes applying one or more camera distortions on the one or more realistic 2D scenes.

5. The method in claim 1, wherein at least one pixel in each realistic 2D scene of the one or more realistic 2D scenes is designated, via the first label data, an object label corresponding to an object of the one or more objects automatically without manual intervention.

6. The method in claim 1, wherein creating the one or more realistic 2D scenes includes texturizing one or more volumetric object placeholders for the one or more objects.

7. The method in claim 1, wherein multiple realistic 2D scenes are created by the generative modelling executed on the 2D scene; and
   wherein each realistic 2D scene of the multiple realistic 2D scenes is used to create the multiple specialized 2D scenes for that realistic 2D scene.

8. The method of claim 1, wherein the 3D occupancy grid map includes a plurality of objects including at least the one or more objects of the 2D scene.

9. A system for generating deep learning training data, the system comprising:
   a computer system having program code stored thereon executable by the computer system to generate the deep learning training data by:
   generating a two-dimensional (2D) scene from an electronic representation of a first three-dimensional (3D) scene of a 3D occupancy grid map;
   generating first label data for one or more objects of the 2D scene;
   executing generative modelling on the 2D scene to create one or more realistic 2D scenes;
   creating multiple specialized 2D scenes from each of the one or more realistic 2D scenes, each specialized 2D scene having one or more pixels that differ from each other specialized 2D scene created from each realistic 2D scene; and
   generating final label data for the one or more objects in the multiple specialized 2D scenes.

10. The system in claim 9, wherein the program code is further executable by the computer system to identify an object class for each object of the one or more objects.

11. The system in claim 9, wherein creating the multiple specialized scenes includes applying one or more climate-related conditions on the one or more realistic 2D scenes.

12. The system in claim 9, wherein creating the multiple specialized 2D scenes includes applying one or more camera distortions on the one or more realistic 2D scenes.

13. The system in claim 9, wherein at least one pixel in each realistic 2D scene of the one or more realistic 2D scenes is designated, via the first label data, an object label corresponding to an object of the one or more objects automatically without manual intervention.

14. The system in claim 9, wherein creating the one or more multiple realistic 2D scenes includes texturizing one or more volumetric object placeholders for the one or more objects.

15. The system of claim 9, wherein the 3D occupancy grid map includes a plurality of objects including at least the one or more objects of the 2D scene.

16. A non-transitory computer-readable storage device having program code stored thereon, the program code to be executed by one or more processors of a computer system to implement a method, the program code comprising:
    program code for generating deep learning training data, wherein generating deep learning training data includes:
    generating a two-dimensional (2D) scene from an electronic representation of a first three-dimensional (3D) scene of a 3D occupancy grid map;
    generating first label data for one or more objects of the 2D scene;
    executing generative modelling on the 2D scene to create one or more realistic 2D scenes;
    creating multiple specialized 2D scenes from each of the one or more realistic 2D scenes; and
    generating final label data for the one or more objects in the multiple specialized 2D scenes.

17. The non-transitory computer readable storage device in claim 16, wherein creating the multiple specialized 2D scenes includes applying one or more climate-related conditions on each of the one or more realistic 2D scenes.

18. The non-transitory computer readable storage device in claim 16, wherein creating the multiple specialized 2D scenes includes applying one or more camera distortions on each of the one or more realistic 2D scenes.

19. The non-transitory computer readable storage device in claim 16, wherein at least one pixel in each of the realistic 2D scenes is designated, via the first label data, an object label corresponding to an object of the one or more objects via the first label data automatically without manual intervention.

20. The non-transitory computer readable storage device of claim 16, wherein the 3D occupancy grid map includes a plurality of objects including at least the one or more objects of the 2D scene.

* * * * *